United States Patent [19]
Questel et al.

[11] Patent Number: 6,020,062
[45] Date of Patent: Feb. 1, 2000

[54] ARTICLE HAVING SLIPPABLE ADHESIVE

[75] Inventors: John M. Questel, Cuyahoga Falls; John J. Pendery, North Royalton, both of Ohio

[73] Assignee: D.W. Wallcovering Inc., Louisville, Ky.

[21] Appl. No.: 08/744,443

[22] Filed: Nov. 8, 1996

[51] Int. Cl.[7] .................................................. C09J 7/02
[52] U.S. Cl. ................................. 428/354; 428/355 RA
[58] Field of Search ................................ 428/343, 354, 428/355 RA

[56] References Cited

U.S. PATENT DOCUMENTS

| | | |
|---|---|---|
| 2,800,457 | 7/1957 | Green . |
| 2,907,682 | 10/1959 | Eichel . |
| 2,988,460 | 6/1961 | Eichel . |
| 2,988,461 | 6/1961 | Eichel . |
| 3,027,271 | 3/1962 | Plasse et al. . |
| 3,212,957 | 10/1965 | Linda . |
| 3,245,601 | 4/1966 | Hawkins . |
| 3,301,741 | 1/1967 | Henrickson . |
| 3,314,838 | 4/1967 | Erwin . |
| 3,331,729 | 7/1967 | Danielson et al. . |
| 3,382,128 | 5/1968 | Bogle . |
| 3,386,846 | 6/1968 | Lones . |
| 3,388,639 | 6/1968 | Rumberger . |
| 3,464,842 | 9/1969 | Jackstadt . |
| 3,554,835 | 1/1971 | Morgan . |
| 3,565,247 | 2/1971 | Brochman . |
| 3,663,269 | 5/1972 | Fischer et al. . |
| 3,741,786 | 6/1973 | Torrey . |
| 3,857,731 | 12/1974 | Merrill, Jr. et al. . |
| 4,054,697 | 10/1977 | Reed et al. . |
| 4,376,151 | 3/1983 | Parrotta . |
| 4,415,615 | 11/1983 | Esmay et al. . |
| 4,525,416 | 6/1985 | Hammerschmidt et al. . |
| 4,556,595 | 12/1985 | Ochi . |
| 4,587,152 | 5/1986 | Gleichenhagen et al. . |
| 4,735,837 | 4/1988 | Miyasaka et al. . |
| 4,946,527 | 8/1990 | Battrell . |
| 5,008,139 | 4/1991 | Ochi et al. . |
| 5,073,457 | 12/1991 | Blackwell . |
| 5,141,790 | 8/1992 | Calhoun . |
| 5,192,612 | 3/1993 | Otter et al. . |
| 5,194,299 | 3/1993 | Fry . |
| 5,196,246 | 3/1993 | Kauss et al. . |
| 5,296,277 | 3/1994 | Wilson . |
| 5,346,766 | 9/1994 | Otter et al. . |
| 5,362,516 | 11/1994 | Wilson et al. . |
| 5,441,784 | 8/1995 | Smith . |
| 5,487,929 | 1/1996 | Rusincovitch, Jr. et al. . |
| 5,508,084 | 4/1996 | Reeves et al. . |
| 5,591,290 | 1/1997 | Walter et al. . |
| 5,639,539 | 6/1997 | DeProspero et al. . |
| 5,662,758 | 9/1997 | Hamilton et al. . |
| 5,676,787 | 10/1997 | Rusincovitch et al. . |
| 5,795,636 | 8/1998 | Keller et al. . |

Primary Examiner—Jenna Davis
Attorney, Agent, or Firm—Darby & Darby

[57] ABSTRACT

This invention provides an article which is capable of being repositioned on a surface while adhering to the surface prior to being bound to the surface. The article, such as a wall covering, has an adhering surface coated with a base adhesive layer, and a low tack adhesive layer containing microparticles. A method of producing an article is also provided.

44 Claims, 2 Drawing Sheets

ARTICLE HAVING SLIPPABLE ADHESIVE

FIELD OF THE INVENTION

This invention relates to articles having slippable adhesives thereon which allow the articles to be positioned on a surface prior to adhesion.

BACKGROUND OF THE INVENTION

Conventional adhesive sheets, such as adhesive wallcovering, are made from a substrate, such as paper, coated with an adhesive. Positioning such sheets on surfaces, however, is often quite difficult because the sheets cannot be moved once they initially touch the surface. The adhesive that is conventionally employed prevents such movement even after application of only minimal pressure to the sheet.

U.S. Pat. No. 3,331,729 describes an adhesive bonding product having microspheres sparsely, but uniformly, distributed over a pressure sensitive adhesive layer. The object containing the adhesive can be positioned on the surface to be adhered to prior to pressing against the object to make a firm bond. Similarly, U.S. Pat. No. 4,556,595 describes a pressure sensitive adhesive sheet having non-adhesive solid microparticles distributed over the surface of the adhesive layer.

Adhesive sheets made according to these patents, however, have no adhesive characteristics when initially applied to a surface. They only adhere to the surface upon application of substantial pressure, which strongly binds the sheet to the surface. The sheet cannot thereafter be repositioned. For this reason, it is very difficult for one person to align such sheets.

Also, uniformly distributing microparticles on the surface of adhesive sheets as described in these patents is extremely difficult.

An object of the present invention, therefore, is to provide an article containing a slippable surface which exhibits a low degree of tack and thereby permits easy movement during alignment of the article, but thereafter allows the article to be adhered to the surface by application of sufficient pressure.

It is also an object of the invention to provide an article that can be initially positioned by application of a small amount of pressure without strongly adhering the article to the surface. The article can than be repositioned, if necessary.

It is also an object of the invention to provide an article containing an adhesive having microparticles that are substantially uniformly dispersed throughout the adhesive, and which can be easily made.

SUMMARY OF THE INVENTION

The present invention relates to an article capable of being repositioned on a surface prior to being adhered to the surface. The article can either be removable only by wetting, scraping or steaming or can be removed by other methods. The article comprises:

(a) a substrate having an adhering surface and a non-adhering surface;

(b) a base adhesive layer covering at least a portion of the adhering surface; and (c) a low tack adhesive layer covering at least a portion of the base adhesive layer. The low tack adhesive layer contains an adhesive and microparticles. Preferably, the microparticles cause the low tack adhesive layer to have a surface for adhering that is not flat. The article is preferably a slippable sheet, such as wallcovering, which can be positioned, and aligned, on a surface before being adhered.

The invention also relates to methods of forming the article, and methods of applying the article to a surface to be adhered to.

DETAILED DESCRIPTION OF THE INVENTION

The present invention relates to a unique adhesive system which allows positioning of an article on a surface whereby a low tack layer allows easy registering of the article with a desired site of bonding. Once the article has been positioned, it can then be adhered to the surface by applying sufficient pressure to fracture the microparticles and/or drive the microparticles in the low tack adhesive layer into the base adhesive layer, thereby bringing adhesive in the base adhesive layer into contact with the surface to be adhered to. The adhesive in the base layer leaks, or viscously flows, through holes formed in the low tack layer in the spaces previously occupied by the microparticles.

The low tack adhesive layer preferably also exhibits low peel adhesion. Application of a small amount of pressure to the article containing such an adhesive does not cause the article to substantially adhere, and the article can thereafter be easily repositioned.

The article can be, for example, a sheet, a mirror panel, lightweight artificial brick, panel, tile, picture, poster, sticker, wall hanging, decorative appliqué, appliance panel, cabinet finish, insulation panel, billboard, display, or any other article that can be adhered to a surface. Preferably, the article is lightweight. Most preferred articles are wallcoverings, wall trim, and shelf or drawer liners.

Figure 1:
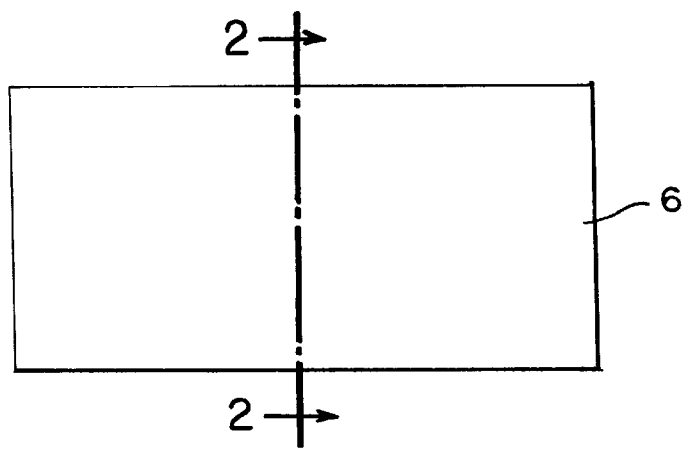
FIG. 1 is a plan view of a slippable adhesive sheet of this invention.
Figure 2:
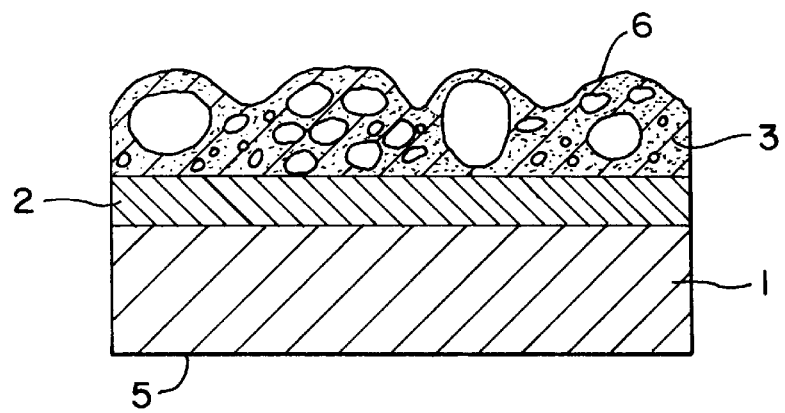
FIG. 2 is an enlarged cross-section view of FIG. 1 along the X line.

FIGS. 1 and 2 depict a preferred embodiment of the invention: a slippable sheet which includes a substrate (1) having an adhering surface (6) and a non-adhering surface (5). Such slippable sheets include, for example, wall covering, wall trim, and liners. Substrate include, but are not limited to, paper, cloth, tape, foil or laminates. The substrate may be coated with, for example ink, wax, foil, or combinations thereof. Coatings can be used to provide decorative wall covering sheets containing printed matter on the non-adhering surface of the substrate material.

The substrate in these sheets can be conventional wall covering substrate, such as a coated paper. Such coated papers are well known, the coating being made from e.g., pigment and latex binder. The pigments can be, e.g., clay and calcium carbonate. One commercially sold paper of this type is identified as C2170-084 sold by Monadnock Paper Mills, Inc. (Bennington, N.H.). The base adhesive layer (2) is disposed between the substrate (1) and low tack adhesive layer (3). The low tack adhesive layer contains microparticles which cause the low tack layer to have a contoured, non-flat, surface for contacting a surface to be adhered to. Although the preferred embodiment of this invention involving a slippable sheet is discussed in detail below, the same teachings can be applied by those skilled in this art to other articles.

A surface of the sheet is at least partially covered with a base adhesive layer. The base adhesive layer contains adhesive that exhibits high adhesion. Preferably, it exhibits a tack of greater than about 100 g/cm$^2$ and less than about 300 g/cm$^2$. The adhesive is preferably capable of strongly adhering the sheet to the surface to be adhered to. As diluted in the layer, the adhesive preferably exhibits a peel value greater than about 0.5 pounds per lineal inch, more preferably greater than about 1.0 pounds per lineal inch, and most preferably greater than about 2.0 pounds per lineal inch. The adhesive can be removable, for example, by peeling without any treatment. The adhesive can also be a "non-removable" or "permanent" adhesive, only removable by wetting, scraping, or steaming. The adhesive used in the base layer, as well as in the low tack layer, is preferably pressure sensitive. Other adhesives may, however, be used. For example, a wettable adhesive might be used which adheres to a wetted surface.

In a preferred embodiment, the adhesive in the base layer is a hot melt adhesive. This allows the base layer to be applied evenly to the surface of a sheet. The low tack layer can then be evenly applied over the surface of the base layer.

In addition to the adhesive, the base layer can contain rheology modifying agents, antioxidants, tackifiers, adhesives, plasticizers, and fillers.

The base adhesive layer preferably has a thickness less than about 0.01 inch, more preferably less than about 0.005 inch, and most preferably about 0.001 inch. The thickness of the base adhesive layer is chosen, in part, so that the microparticles can embed themselves upon application of sufficient pressure without protruding from the layer. The thickness of the base adhesive layer can be less than the diameter of the largest microparticles.

The base adhesive layer preferably has a viscosity of from about 2000 cps to about 50,000 cps at 350° F. In a preferred embodiment, the viscosity of the base layer ranges from about 5,000 cps to about 20,000 cps at 350° F. The viscosity of the base adhesive layer can be adjusted to influence the rate at which the base layer seeps out once pressure is applied to the sheet.

The low tack adhesive layer covers at least a portion of the base adhesive layer and contains microparticles dispersed throughout and preferably uniformly dispersed. It may be continuous or discontinuous. The low tack adhesive layer can contain a high tack adhesive. The particular combination of adhesive and microparticles determines the tack of the layer. Thus, a high tack adhesive, e.g., exhibiting a tack of more than 600 grams, can be combined with microparticles to obtain a layer that has low tack because the microparticles contact the surface to be adhered to (resulting in contact over a small surface area). Preferably the low tack adhesive layer exhibits a tack of less than about 200 g/cm$^2$, more preferably less than about 50 g/cm$^2$, and most preferably less than about 5 g/cm$^2$.

The adhesive in the low tack adhesive layer preferably exhibits low peel adhesion. This allows the sheet to be easily repositioned after an amount of pressure is applied which is low enough that the sheet is not substantially adhered by the adhesive contained in the base adhesive layer. Preferably, the adhesive, as diluted in the low tack adhesive layer, exhibits a peel adhesion of less than about 0.75 pounds per lineal inch, more preferably less than about 0.2 pounds per lineal inch.

The low tack adhesive layer preferably has a Brookfield LV viscosity of between about 800 and about 1500 cps at 25° C. Microparticles are dispersed substantially uniformly throughout the low tack adhesive layer. Suitable microparticles may be hollow, solid, or a combination thereof. The microparticles can be breakable or non-breakable upon application of pressure to the article. The microparticles can also be collapsible (without breaking) upon application of pressure to the article, or non-collapsible. Preferred are microparticles that are breakable, and non-collapsible.

The microparticles can be made of any material having the appropriate size and other desired characteristics. For example, the microparticles can be made of glass, silica, clay, urea-formaldehyde resin, acrylate polymer, acrylate copolymer, rubber, foamed organic polymers, polytetrafluoroethylene, phenolic resin, calcium carbonate, aluminum hydroxide, ferrous oxide, or styrene resin. Hollow glass microspherules are preferred.

The microparticles can be of any diameter less than about 500 microns (i.e., 0.02 inch). Preferably, a mixture of microparticles have diameters less than about 200 microns (i.e., 0.008 inch) is used. In one embodiment, the microparticles are microspheres having mixed diameters less than about 125 microns (i.e., 0.005 inch).

Suitable microparticles are commercially available, and include Scotchlite™ "glass bubbles" (3M Co., St. Paul, Minn.), Dualite™ hollow spheres (Pierce & Stevens Corp., Buffalo, N.Y.), Q-CEL™ "extendospheres" (PQ Corp., Valley Forge, Pa.), Extendospheres "BUBBLECUP" (PA Industries, Inc., Chattanooga, Tenn.), and Expancel™ microspheres (Expancel Inc., Diluth, Ga.). Scotchlite™ K37 "glass bubbles" (3M Corp., St. Paul, Minn.) are particularly preferred. These microspheres have mixed diameters of less than 125 microns and a typical density of about 0.37 g/cm$^2$.

The low tack adhesive layer may also contain surfactants such as an alkyl hydroxy alkyne (e.g., Surfynol™ (Air Products, Allentown, Pa.)), and rheology modifiers such as a methylated hydrocarbon (e.g., Aerosol™ (Cytec, W. Patterson, N.J.)).

The low tack adhesive layer preferably has a rough, or contoured, surface caused by protuberance of the microparticles. This lowers the surface area of the adhering surface that contacts the surface to be adhered to and can cause the low tack layer to exhibit its low tack. Thus, the thickness of the low tack adhesive layer at any point can vary depending on the diameter of any microparticle present at that point. The thickness of the low tack adhesive layer, measured at the thickest point, is preferably less than about 0.01 inch, more preferably less than about 0.005 inch. The thickness of the low tack layer measured at the thinnest point is preferably less than the diameter of the largest microparticles.

The low tack adhesive layer, and the base adhesive layer should preferably be effectively incompatible so that they do not mix or diffuse into one another to any degree that would destroy the individual properties of each layer. In a preferred embodiment, the base adhesive layer is applied as a dispersion of a hot melt adhesive at elevated temperature, such as 350° F. For example, a rubber resin can be used as the hot melt adhesive. The low tack adhesive layer is then applied as an aqueous dispersion on top of the base adhesive layer and dried, e.g., in an oven. Similarly, the low tack base adhesive preferably has a composition that inhibits diffusion into the base adhesive layer, and the base adhesive layer has a composition that inhibits diffusion into the low tack layer. The low tack adhesive layer and base layer should not substantially mix prior to the time that the sheet is applied to the surface to be adhered to. Preferably, the base layer diffuses less than about 50% into the low tack layer, more preferably less than about 20%, most preferably less than about 15%, over a period of two years at room temperature.

Conventional pressure-sensitive adhesives can be used in both the base adhesive layer and the low tack adhesive layer. These can be chosen from among, for example, acrylic adhesives, and rubber resin adhesives.

Acrylic adhesives include, for example, homopolymers, copolymers or crosslinked copolymers of at least one acrylic or methacrylic component, for example acrylic esters such as methyl acrylate, ethyl acrylate, n-propyl acrylate, isopropyl acrylate, n-butyl acrylate, isobutyl acrylate, tert.-butyl acrylate, amyl acrylate, hexyl acrylate, octyl acrylate, 2-ethylhexyl acrylate, undecyl acrylate or lauryl acrylate, or as a comonomer, a carboxyl-containing monomer such as (meth)acrylic acid, itaconic acid, crotonic acid, maleic acid, maleic anhydride or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl (meth)acrylamide or N-ethyl(meth)acrylamide, a methylol group-containing monomer such as N-methylol(meth) acrylamide or dimethylol(meth)acrylamide, an amino-containing monomer such as aminoethyl(meth)acrylate, dimethylaminoethyl(meth)acrylate or vinylpyridine, or a non-functional monomer such as ethylene, propylene, styrene or vinyl acetate.

Rubber adhesives include, for example, natural rubber, isoprene rubber, styrene-butadiene rubber, styrene-butadiene block copolymer, styrene-isoprene block copolymer, butyl rubber, polyisobutylene, silicone rubber, polyvinyl isobutyl ether, chloroprene rubber and nitrile rubber.

Pressure sensitive adhesives are preferred. Suitable pressure sensitive adhesive for use in the invention are commercially available. A preferred commercially available pressure sensitive adhesive for use in the low tack adhesive layer is Flexcryl™ 1625 (Air Products Allentown, Pa.), an acrylic polymer based adhesive. Preferred commercially available pressure sensitive adhesives for use in the base adhesive layer contain Kraton™ D-1107 and Kraton™ D-1102, block copolymers of styrene-butadiene-styrene, styrene-isoprene-styrene, styrene-ethylene-butylene-styrene, and styrene-ethylene-propylene (Shell Chemical Co., Houston, Tex.). In the embodiment described in the Examples below, Kraton™ D-1107 and Kraton™ D-1102 are used in combination.

Permanent adhesives for use in the invention are well known and include adhesives commercially sold as H2179-01 (Findley Adhesives Inc., Wauwatosa, Wis.) and LHM 2512 (Imperial Adhesives).

Tackifying agents may be added if desired. Such agents are well known in the art. Typical commercially available agents include polyterpenes with ring and ball softening point from 85–115° C., such as AONESTERT™ (Arizona Chemical, Panama City, Fla.) and PICCOLYTE™ (Hercules, Wilmington, Del.) or hydrocarbon resins from the $C_5$–$C_9$ oil refining stream such as ESCOREZ™ (Exxon, Houston, Tex.) and WINGTACK™ (Goodyear, Akron, Ohio).

Figure 4:
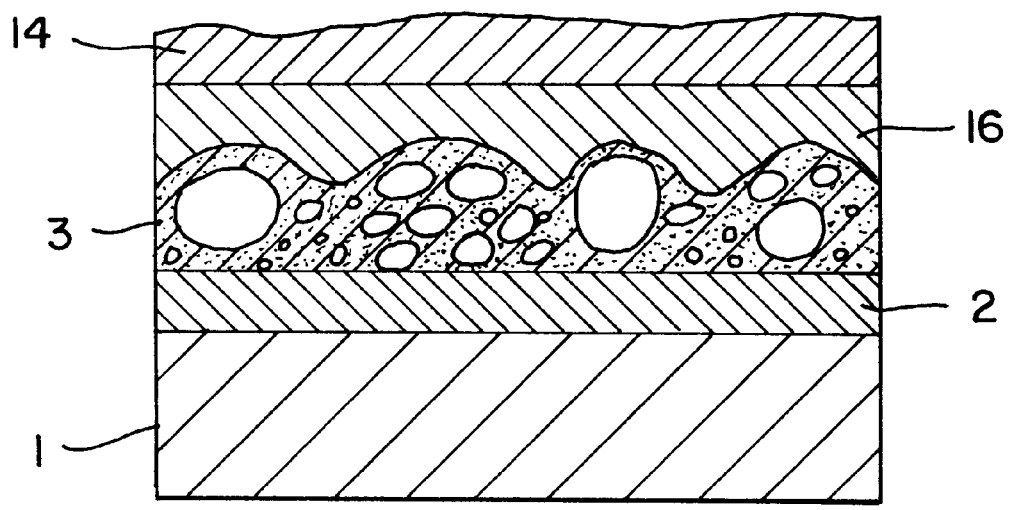
FIG. 4 is a cross-section of an adhesive sheet of the invention having a release layer and a peelable layer on the adhering surface of the substrate.
Figure 5:
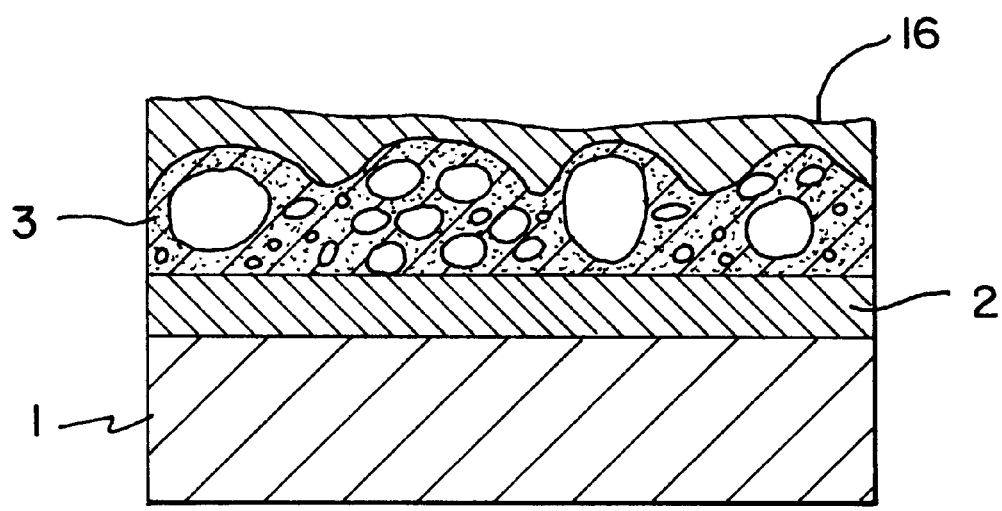
FIG. 5 is a cross-section of an adhesive sheet of the invention having a release layer on the adhering surface of the substrate.

If desired, the low tack adhesive layer can be covered with a release layer comprising, for example, a coating containing silicone, or with a peelable release layer, such as silicone coated papers. Such layers are well known in this art. UV 9300 (GE Silicones, Waterford, N.Y.) is one commercially available release layer. FIG. 5 shows such a sheet having a release layer (16). In FIG. 4, the release layer is covered by a peelable layer (14).

Figure 3:
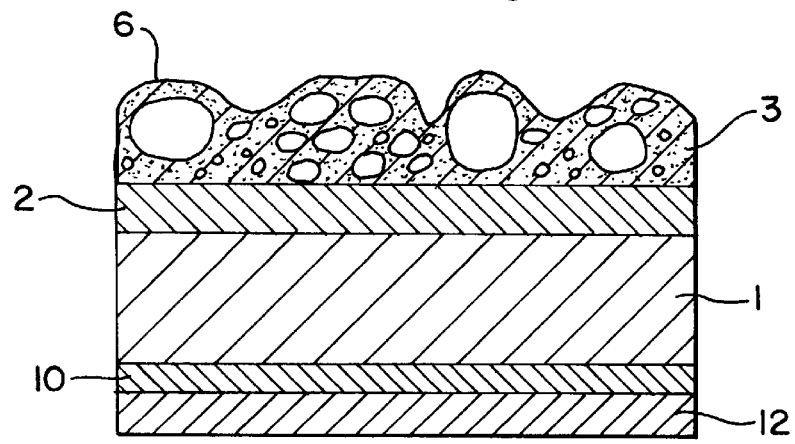
FIG. 3 is a cross-section of an adhesive sheet of the invention having a release layer and a peelable layer on the non-adhering surface of the substrate.

Similarly, as shown in FIG. 3, the non-adhering layer of the sheet, e.g., a printed side of wallcovering, may be covered with a release layer (10) and/or a peelable layer (12). Such layers are conventionally applied, and act to reduce and stabilize unwind tension.

When the slippable sheet of the invention is applied to a surface, the surface is in contact with the low tack adhesive layer. The overall low tack of this layer allows the slippable sheet to be easily moved or repositioned. For example, wall covering having a printed surface can be easily moved to obtain registration of the print pattern. Pressure may then be applied by hand to a portion of the adhesive sheet, usually the top of the sheet, in order to break and/or to drive the microparticles dispersed in the low tack adhesive layer into the base adhesive layer. If a low degree of pressure is applied, such as normally occurs when pressing with the hand, the pressure sensitive adhesive in the low tack adhesive layer can primarily hold the sheet in place while the rest of the sheet is positioned. Once the rest of the sheet is positioned, higher pressure can be applied, such as with a squeegee, to allow the pressure sensitive adhesive in the high tack layer to strongly adhere the sheet to the surface. Use of a removable adhesive, as opposed to a permanent adhesive, allows the sheet to be removed without wetting, scraping, or steaming at a later date, if desired.

The slippable sheet of this invention can be made by conventional means. In one manufacturing process, a roll provides a substrate, preferably having a print on the top side of the substrate. The substrate is fed through various idler and tensioning rollers, as is well known by those skilled in the art, where a high tack pressure sensitive adhesive material is applied. The high tack adhesive material is dispersed on the bottom side of the paper. An adhesive application roller or slot die may be used to apply a controlled and evenly distributed amount of the adhesive along the bottom surface of the substrate. Once the high tack adhesive material is applied and has cured, the low tack adhesive layer is conventionally applied over the high tack adhesive material. A reverse roll is preferred as the coating head in the application process. A wire wound coating head has also been found to be suitable. The low tack adhesive layer is dried prior to use.

All patents, applications, publications, and test methods mentioned herein are hereby incorporated by reference. Many variations of the present invention will suggest themselves to those skilled in this art in light of the detailed description herein. All such obvious variations are within the full intended scope of the claims appended hereto.

The present invention is illustrated in the experiments described in the following examples. It should be understood that the invention is not limited to the specific examples or the details described therein.

EXAMPLE I

Test samples of wallpaper were obtained having a high tack pressure sensitive base adhesive layer thereon. The base adhesive layer was applied using a hot melt process and had a thickness of about 0.00075 inch. It was applied to the wall covering by slot die coating of the molten formula using a coater produced by the May Company (Minneapolis, Minn). The composition of the layer was as follows (all parts by weight):

Kraton™ D-1107 - 50 parts
Kraton™ D-1102 - 50 parts
Escorez™ 5380 - 60 parts
Irganox™ 1010 - 1 part
Shellflex™ 371 - 10 parts
Super-Pflex™ 2000 - 30 parts The Kraton™ components are block copolymer elastoplastics adhesives that are further described above. Escorez™ 5380 (Exxon Chemical Co., Houston, Tex.) is a hydrogenated hydrocarbon tackifying resin. Irganox™ 1010 (Ciba-Geigy) is an antioxidant (having the chemical name tetrakis [methylene (3,5-di-tert-butyl-4-hydroxyhydrocinnamate)] methane). Shellflex™ 371 is a napthenic oil. Super-Pflex™ 2000 (Pfizer Minerals, Pigments & Metals Division, New York, N.Y.) is a surface treated calcium carbonate.

A series of different low tack pressure sensitive adhesive layers were applied to the wall paper prepared above. The low tack layer was applied using a wire wound bar, set to apply a 0.005 inch layer. Scotchlite™ K37 glass bubbles are microparticles that are further described above. Acrylsol™ 6038A is a polyacrylic acid based thickening agent. Flexcryl™ 1625 is a pressure sensitive adhesive exhibiting a tack of about 600 grams and a shear of 17 hours. Table I shows the formulations that were applied.

TABLE I

| Compositions of Formulae A–H | | | | | |
|---|---|---|---|---|---|
|  | A | B | C | D | E |
| Water | 55.6% | 53.6% | 45.5% | 68.2% | 55.6% |
| Scotchlite ™ K37 glass bubbles | 11.1% | 7.1% | 4.5% | 4.5% | 6.7% |
| Acrylsol ™ 6038A | 5.6% | 3.6% | 4.5% | 4.5% | 4.4% |
| Flexcryl ™ 1625 | 27.8% | 35.7% | 45.5% | 22.7% | 33.3% |

|  | F | G | H |
|---|---|---|---|
| Water | 73.9% | 53.1% | 53.6% |

TABLE I-continued

| Compositions of Formulae A–H | | | |
|---|---|---|---|
| Scotchlite ™ K37 glass bubbles | 8.7% | 3.5% | 0.7% |
| Acrylsol ™ 6038A | 4.3% | 8.0% | 10.0% |
| Flexcryl ™ 1625 | 13.0% | 35.4% | 35.7% |

The resulting samples were tested after about 3 weeks. The degree of peel was tested according to ASTM-903, except that a squeegee was used to apply pressure. The amount of tack was tested according to ASTM D-2979. Loss of adhesion was noted as edgelifting or flagging. Edgelifting indicates a minor lifting of the wallpaper that can be measured in millimeters on only one portion of the paper. Flagging is a more significant lifting of the paper that can be measured in inches. The results are shown in Table II.

TABLE II

| Test Results of Coating for Formulae A–H | | | | | |
|---|---|---|---|---|---|
|  | 24 hr. Peel (pli) Squeegee | | | Particle | |
| Formulae | Avg. | Max. Avg. | Tack (g) | Count (per sq. in.) | Result |
| A | 0.133 | 0.236 | 0 | 223020 | Total Adhesion |
| B | 0.283 | 0.521 | 0 | 175230 | Total Adhesion |
| C | 0.808 | 1.437 | 0 | 121068 | Total Adhesion |
| D | 0.275 | 0.494 | 0 | 162486 | Total Adhesion |
| E | 0.408 | 0.668 | 0 | 149742 | Total Adhesion |
| F | 0.029 | 0.078 | 0 | 213462 | Edge Lift |
| G | 0.200 | 0.405 | 0 | 174434 | Total Adhesion |
| H | 1.500 | 2.469 | 0 | 72482 | Total Adhesion |

Pli = pounds per lineal inch

The wallpaper made with these formulations had the desired tack characteristics, allowing for easy positioning of the wallpaper.

EXAMPLE II

The formulations shown in Table I were diluted as shown in Table III below. A surfactant, Aerosol™ NPES-2030, was added to better disperse the glass bubbles, which helped to maintain a thick wet coat and prevent running. The effects of such dilution are shown in Tables IV and V.

TABLE III

| Compositions of Formulae | | | | | | | | | | |
|---|---|---|---|---|---|---|---|---|---|---|
|  | I | J | K | L | M | N | O | P | Q | R |
| Water | 64.0% | 77.3% | 81.8% | 72.0% | 83.5% | 86.9% | 71.6% | 83.2% | 86.3% | 71.9% |
| Scotchlite ™ K37 glass bubbles | 2.0% | 0.8% | 0.4% | 3.1% | 1.2% | 0.6% | 1.7% | 0.7% | 0.3% | 0.3% |
| Acrysol ™ 6038A | 14.0% | 14.0% | 13.9% | 9.5% | 9.2% | 9.5% | 9.7% | 9.3% | 10.1% | 10.4% |
| Flexcryl ™ 1625 | 20.0% | 7.9% | 3.9% | 15.4% | 6.1% | 3.0% | 17.0% | 6.8% | 3.3% | 17.4% |
| Aerosol ™ NPES-2030 | — | 1 dp | 2 dps | — | 1 dp | 2 dps | 1 dp | 2 dps | 2 dps | 1 dp | dp = drop

TABLE IV

Effect of Dilutions on Coating Properties

| Formula | Dilution (formula: water) | 24 hr. Peel (pli) Avg. | 24 hr. Peel (pli) Max.Avg. | Tack (g) | Particle Count (per sq. in.) | Result |
| --- | --- | --- | --- | --- | --- | --- |
| Control | — | 0.325 | 0.440 | 100 | 0 | Flagging |
| I | 1:1 | 0.129 | 0.191 | 0 | 111510 | Edge Lift |
| J | 1:4 | 0.042 | 0.077 | 0 | 64517 | Edge Lift |
| K | 1:9 | 0.067 | 0.130 | 0 | 57348 | Edge Lift |
| L | 1:1 | 0.034 | 0.068 | 0 | 156911 | Edge Lift |
| M | 1:4 | 0.021 | 0.043 | 0 | 149742 | Edge Lift |
| N | 1:9 | 0.029 | 0.065 | 0 | 76464 | Edge Lift |

TABLE V

Effect of Dilution on Coating Properties

| Formula | Dilution (formula: water) | 24 hr. Peel (pli) Avg. | 24 hr. Peel (pli) Max.Avg. | Tack (g) | Particle Count (per sq. in.) | Result |
| --- | --- | --- | --- | --- | --- | --- |
| Control | — | 0.325 | 0.440 | 100 | 0 | Flagging |
| O | 1:1 | 0.275 | 0.463 | 0 | 109121 | Total Adhesion |
| P | 1:4 | 0.042 | 0.089 | 0 | 86819 | Edge Lift |
| Q | 1:9 | 0.017 | 0.038 | 0 | 50976 | Edge Lift |
| R | 1:1 | 0.150 | 0.336 | 0 | 55755 | Edge Lift |

Thus, peel adhesion decreased with dilution. Lower peel is considered less desirable.

EXAMPLE III

A low tack adhesive layer was made having Formula S, shown in Table VI below. Specifically, in one vessel, half of the water and the SCOTCHLITE™ K37 glass bubbles were added and mixed thoroughly with a propeller type mixer. AEROSOL™ NPES-2030 was added, and the formula mixed thoroughly. In a second vessel, a slurry was made of ATTAGEL™ 50 with some of the water (1 part ATTAGELT™ 50 to 4 parts water). Attagel™ (Engelhard, Iselin, N.J.) is an attapulgite clay used as a thickener. The rest of the water was then added and the formula mixed thoroughly. FLEXCRYL™ 1625 was then added and the resulting ATTAGEL™/FLEXCRYL™ mixture was slowly added to the SCOTCHLITE™/AEROSOL™ mixture. The resulting formula was stirred until thoroughly mixed and uniform.

Formulations were coated onto the wallpaper described in Example I above having a pressure sensitive base adhesive layer thereon, using a coating machine equipped with a wire wound bar. The results of tests run on the coated paper are shown in Table VI.

Run S1 had uneven coating resulting in substantial tack and poor adhesion. Run S2 coated better, but not as uniformly as desired. Run S3 achieved the most uniform coating.

TABLE VI

Properties of Formula S
39.3% Water
42.7% Flexcryl ™ 1625
8.5% Scotchlite ™ K37 glass bubbles
34% Attagel ™ 50
6.0% Aerosol ™ NPES-2030

| Run | No. of Wire Wound Bar used | 24 hr. Peel (pli) Avg. | Max. Avg. | Tack (g) | Particle Count (per sq. in.) | Result |
| --- | --- | --- | --- | --- | --- | --- |
| Control | | 0.325 | 0.440 | 100 | 0 | Flagging |
| S1 | 35 | 0.092 | 0.175 | 10 | 11948 | Total Adhesion |
| S2 | 45 | 0.283 | 0.507 | 0 | 248508 | Total Adhesion |
| S3 | 100 | 1.192 | 1.779 | 0 | 190364 | Total Adhesion |

EXAMPLE IV

Formula S was applied to wallpaper that was previously coated with either H2181-01 hot melt adhesive or H2274-01 hot melt adhesive (Findley Adhesives Inc., Wauwatosa, Wis.). H2181-01 is a rubber based adhesive with oils and resins added. The H2181-01 adhesive exhibited a tack of 130 g, while the H2274-01 adhesive exhibited a tack of 330 g. In one sample, Formula Z was coated on hot melt adhesive H2274-01. Formula Z was the same as Formula S, but with 50% more SCOTCHLITE™ K37 glass bubbles. The wallpaper was then tested for slippability.

Specifically, a sled made of painted (2 coats latex semi-glass) drywall of approximately 5 square inches was dragged across strips of wallpaper having adhesive coatings thereon. Weights were added to the sled to increase the pressure on the wallpaper. The amount of force needed to pull the sled across the paper was measured with a tensile tester (Tinius Olsen). This simulated the force and paper speed used when aligning wallpaper on a wall.

The samples consisted of three pairs of papers. One paper in each pair was coated with hot melt pressure sensitive base adhesive layer only. The second paper had a low tack adhesive layer over the base layer. Each paper was tested using different amounts of force pressing the dry wall against the paper as it slid across the surface.

The results are shown in Table VII. There was a substantial reduction in the amount of force required to pull the dry wall over the slippable adhesive paper at a given loading. As the load increased, the force required to pull the dry wall become greater.

Thus, the slippable sheet of the invention moved more easily than the sheet without a low tack adhesive layer.

The sheet of the invention was also found to adhere with increased load. When loaded with 2630 g. (>1 psi) the sheet with and without the low tack adhesive layer yielded equivalent adhesion. Therefore, when a light touch (i.e., a low load) is used, there is little resistance to sliding the sheet. But when pressed with a heavy hand (i.e., high load) the force needed to move the sheet far exceeds the weight of the sheet, and the sheet stays in place. Sample V was found to have the best slippability and adhesion.

TABLE VII

FORCE IN POUNDS NEEDED TO MOVE WALL PAPER SAMPLES OVER PAINTED DRYWALL*

| SAMPLE | Coating on Wallpaper | 130 g | 330 g | 530 g | 2130 g** | 2630 g** |
|---|---|---|---|---|---|---|
| T | H2181-01 adhesive only | 0.39/0.32 | 0.83/0.68 | 1.4/1.3 | 4.6/3.9 | 5.2/4.9 |
| U | H2181-01 and formula S | 0.25/0.21 | 0.72/0.70 | 1.3/1.2 | 3.8/3.2 | 5.2/5.0 |
| V | H2181-01 adhesive only | 0.38/0.36 | 0.89/0.80 | 1.4/1.3 | | |
| W | H2181-01 and formula S | 0.31/0.29 | 0.82/0.76 | 1.3/1.1 | | |
| X | H2274-01 adhesive only | 0.41/0.32 | 1.1/1.0 | 1.7/1.4 | | |
| Y | H2274-01 and formula Z | 0.31/0.30 | 0.81/0.68 | 1.2/1.1 | | |

**Results of single test run.
*Data reported as (average peak force)I(average force)

EXAMPLE V

Four papers containing base adhesive layers were obtained for coating in this experiment. One contained base layer described in Example I. The three others were chosen to cover a range of tack from about 300–700 g/cm$^2$. Details on the layers' tack and film thicknesses are shown in Table VIII.

The base adhesives having tack over 400 were difficult to coat over with the low tack layer because they grabbed onto rollers in the pay-out stand of the coating machine, causing high web tension. The data in Table VIII also show some unevenness in the cross directional coating thickness on the paper, i.e., differences in the "left" and "right" side thickness and coating weight values shown for the papers. H2179-01 is a permanent adhesive sold by Findley Adhesives Inc., Wauwatosa, Wis.. LHM 2512 is a permanent adhesive sold by Imperial Adhesives. H2274-01 is a removable adhesive sold by Findley Adhesives Co.

The Low Tack Coating Formulae

Three low tack adhesive layer formulae used are listed in Table IX. Formula T was a scaled up version of Formula S. Formula U contained more Flexcryl™ adhesive to prevent glass bubbles from floating to the surface of the liquid coating during storage and provide higher paper adhesion. Formula V contained 50% more glass bubbles, to improve glass bubble stability and test further reduction in the tack of the adhesive.

Low Tack Coatings

The low tack formulae described above were coated onto the different papers containing base adhesive layers thereon using a nip-fed reverse roll coating head. The head was set at a gap of 4 mils (shimmed) to allow the larger glass bubbles to pass through. The wet coatings of the T and V formulae were smooth and uniform. After drying in an oven, their appearance was smooth and flat. There was also no tack to the touch. The U formulation was too thin (i.e., low viscosity) to coat effectively. It was only run on the paper containing the base layer of Example I. Each paper was rolled up on individual cores. The papers were tested for tack and peel. Results are shown in Table X.

When taken off the roll after wind up, all papers showed a shiny side and a flat side on the adhering surface. The shiny side was tacky and the flat side had little to no tack. This problem was believed caused by glass bubbles pressed into the base adhesive in the more heavily coated portions of the paper.

Conclusions

Formula U was too thin to coat and the tack of the low tack adhesive layer was too high to allow adequate slipability. Formula V had low tack but too many glass bubbles to allow it to adhere adequately. Formula T had satisfactory properties.

TABLE VIII

HOT MELT PRESSURE SENSITIVE ADHESIVE COATED PAPERS USED

| BASE ADHESIVE | Tack (g/cm$^2$) | FILM THICKNESS (mils) | | COAT WEIGHT (g/100 in$^2$) | |
|---|---|---|---|---|---|
| | | Left | Right | Left | Right |
| H2179-01 | 400–500 | 1.5 | 1.1 | 3.07 | 2.21 |
| LHM 2512 | 600–700 | 1.0 | 0.7 | 2.33 | 1.99 |
| Example I Base Adhesive | Not measured | 0.7 | 0.7 | 1.77 | 1.72 |
| H2274-01 | 300 | 0.6 | 0.4 | 1.96 | 1.53 |

TABLE IX

LOW TACK ADHESIVE FORMULATIONS (IN GRAMS)

| MATERIALS | T | U | V |
|---|---|---|---|
| Deionized Water | 1600 | 1600 | 1600 |
| Attagel ™ | 320 | 320 | 320 |
| Flexcryl ™ 1625 | 4000 | 4800 | 4000 |

TABLE IX-continued

LOW TACK ADHESIVE FORMULATIONS (IN GRAMS)

| MATERIALS | T | U | V |
|---|---|---|---|
| Deionized Water | 2080 | 2080 | 2080 |
| Scotchlite ™ | 800 | 800 | 1200 |
| Aerosol ™ NPES 2030 | 560 | 560 | 640 |
| % Solids | 40.4 | 44.3 | 42.3 |
| Viscosity (cps)* | 1000 | 390 | 1210 |

*Brookfield LV with #3 spindle at 60 rpm

TABLE X

PROPERTIES OF DIFFERENT PAPERS

| BASE ADHESIVE | LOW TACK ADHESIVE LAYER | TACK (g/cm²) | PEEL (pli) PEAK | PEEL (pli) AVERAGE |
|---|---|---|---|---|
| H2179-01 | None | 680 | 5.2 | 4.4 |
|  | T | 0 | 2.0 | 1.4 |
|  | V | 0 | 0.29 | 0.23 |
| LHM 2512 | None | 960 | 9.1 | 8.1 |
|  | T | 2.1 | 4.2 | 2.8 |
|  | V | 0 | 0.4 | 0.3 |
| Example I Adhesive | None | 130 | 1.4 | 0.8 |
|  | T | 1.4 | 0.4 | 0.2 |
|  | U | 25 | 2.5 | 1.2 |
|  | V | 12 | 0.04 | 0.02 |
| H2274-01 | None | 320 | 3.0 | 2.5 |
|  | T | 1.4 | 1.1 | 0.5 |
|  | V | 0 | 0.3 | 0.2 |

We claim:

1. An article comprising:
   (a) a substrate having an adhering surface and a non-adhering surface;
   (b) a base adhesive layer comprising a first adhesive and covering at least a portion of said adhering surface; and
   (c) a low tack adhesive layer covering at least a portion of said base adhesive layer, said low tack adhesive layer comprising a second adhesive and displaceable or fracturable microparticles dispersed therein;
   wherein said low tack adhesive layer is fracturable or displaceable to create pathways for at least a portion of said first adhesive to pass through said low tack adhesive layer;
   wherein said first adhesive and said second adhesive are the same or different.

2. The article of claim 1 wherein said microparticles cause said low tack adhesive layer to have a surface for adhering that is not flat.

3. The article of claim 1 wherein said base adhesive layer and said low tack adhesive layer are incompatible.

4. The article of claim 1 wherein said first adhesive is a permanent adhesive.

5. The article of claim 1 wherein said first adhesive is removable by wetting, scraping, or steaming.

6. The article of claim 1 comprising a slippable adhesive sheet.

7. The article of claim 1 comprising wallcovering.

8. The article of claim 1 comprising wall trim.

9. The article of claim 1 wherein said substrate is selected from the group consisting of paper, vinyl, and fabric.

10. The article of claim 1 wherein said non-adhering surface of said substrate is coated.

11. The article of claim 1 wherein said non-adhering surface of said substrate is coated with a coating selected from the group consisting of ink, wax, foil, and any combination thereof.

12. The article of claim 1 wherein at least a portion of said non-adhering surface of said substrate is covered by a release layer.

13. The article of claim 1 wherein at least a portion of the coated non-adhering surface is covered by a release layer.

14. The article of claim 8 wherein said release layer comprises a coating comprising silicone.

15. The article of claim 8 wherein said release layer comprises a peelable release layer.

16. The article of claim 1 wherein said based adhesive layer is incompatible with said low tack adhesive layer.

17. The article of claim 1 wherein said base adhesive layer is capable of diffusing less than 50% into said low tack adhesive layer at room temperature over a period of two years.

18. The article of claim 1 wherein said base adhesive layer is capable of diffusing less than 20% into said low tack adhesive layer at room temperature over a period of two years.

19. The article of claim 1 wherein said microparticles are uniformly dispersed in said low tack adhesive layer.

20. The article of claim 1 wherein said microparticles are selected from the group consisting of hollow microparticles and solid microparticles.

21. The article of claim 1 wherein said microparticles are comprised of material selected from the group consisting of glass, silica, clay, urea-formaldehyde resin, acrylate polymer, acrylate copolymer, rubber, foamed organic polymers, polytetrafluoroethylene, phenolic resin, calcium carbonate, aluminum hydroxide, ferrous oxide or styrene resin.

22. The article of claim 1 wherein said microparticles are hollow glass spheres.

23. The article of claim 22 wherein said glass spheres have diameters less than about 200 microns.

24. The article of claim 1 wherein said adhesive in said low tack adhesive layer is a high tack adhesive that exhibits tack greater than about 200 g/cm².

25. The article of claim 1 which exhibits a tack of less than 5 g/cm².

26. The article of claim 1 wherein said base adhesive layer comprises a hot melt adhesive.

27. The article of claim 1 wherein said base adhesive layer comprises a pressure sensitive adhesive.

28. The article of claim 26 wherein said adhesive is removable by heat.

29. The article of claim 1 wherein said base adhesive is removable by wetting, scraping, or steaming.

30. The article of claim 1 wherein said low tack adhesive layer is continuous.

31. The article of claim 1 wherein said low tack adhesive layer further comprises a composition selected from the group consisting of a surfactant and a rheology modifier.

32. The article of claim 1 wherein said base adhesive layer further comprises a composition selected from the group consisting of a surfactant, a rheology modifier, and a tackifier.

33. The article of claim 1 wherein said low tack adhesive layer has a Brookfield LV viscosity ranging from about 800 to about 1500 cps at room temperature.

34. The article of claim 1 wherein said base adhesive layer has a viscosity of from about 2000 cps to about 50,000 cps at 350° F.

35. The article of claim 1 wherein said base adhesive layer has a viscosity of from about 5,000 cps to about 20,000 cps at 350° F.

36. The article of claim 1 wherein the thickness of said low tack adhesive layer is less than about 0.01 inch.

37. The article of claim 1 wherein the thickness of said based adhesive layer is less than about 0.01 inch.

38. A slippable adhesive sheet comprising:
   (a) a substrate having an adhering surface and a non-adhering surface;
   (b) a base adhesive layer covering at least a portion of said adhering surface; said base adhesive layer comprising a hot melt pressure sensitive adhesive, said base adhesive layer exhibiting a peel adhesion of more than 0.5 pounds per lineal inch; and
   (c) a low tack adhesive layer covering at least a portion of said base adhesive layer, said low tack adhesive layer comprising a pressure sensitive adhesive and displaceable or fracturable hollow glass microparticles dispersed therein, said microparticles causing said low tack adhesive layer to have a surface for adhering that is not flat, said low tack adhesive layer exhibiting a peel adhesion of less than about 0.75 pounds per lineal inch, wherein said peel adhesion exhibited by said low tack adhesive layer is less than said peel adhesion exhibited by said base adhesive layer;
   wherein said low tack adhesive layer is fracturable or displaceable to create pathways for said first adhesive to pass through said low tack adhesive layer; and
   wherein said base adhesive layer is capable of diffusing less than about 20% into said low tack adhesive layer at room temperature over a period of two years.

39. A slippable adhesive sheet comprising:
   (a) a substrate having an adhering surface and a non-adhering surface;
   (b) a base adhesive layer covering at least a portion of said adhering surface; said base adhesive layer comprising a hot melt pressure sensitive adhesive, said base adhesive layer being less than about 0.005 inch in thickness; said base adhesive layer exhibiting a peel adhesion of more than about 2.0 pounds per lineal inch, and a tack of between about 100 g/cm$^2$ and 300 g/cm$^2$; and
   (c) a low tack adhesive layer covering at least a portion of said base adhesive layer, said low tack adhesive layer comprising a pressure sensitive adhesive and displaceable or fracturable hollow glass microparticles having diameters less than about 125 microns dispersed therein, said microparticles causing said low tack adhesive layer to have a surface for adhering that is not flat, said low tack adhesive layer being less than about 0.005 inch in thickness, said low tack adhesive layer exhibiting a peel adhesion of less than about 0.2 pounds per lineal inch;
   wherein said low tack adhesive layer is fracturable or displaceable to create pathways for said first adhesive to pass through said low tack adhesive layer; and
   said base adhesive layer being capable of diffusing less than about 15% into said low tack adhesive layer at room temperature over a period of two years, said sheet exhibiting a tack of less than about 5 g/cm$^2$.

40. An article having a surface, said surface having adhered thereto an adhering surface of a covering, said covering having:
   (a) an adhering surface and a non-adhering surface;
   (b) a base adhesive layer comprising a first adhesive and covering at least a portion of said adhering surface; and
   (c) a low tack adhesive layer covering at least a portion of said base adhesive layer, said low tack adhesive layer comprising a second adhesive and microparticles;
   wherein at least a portion of said microparticle of said low tack adhesive layer are fractured or displaced into said base adhesive layer thereby creating voids in said low tack adhesive layer and wherein at least a portion of said first adhesive has passed through said voids to contact said surface of said article.

41. An article as defined in claim 40, wherein said first adhesive is a permanent adhesive.

42. An article as defined in claim 40, wherein said first adhesive is removable from said article surface by wetting, scraping, or steaming.

43. An article as defined in claim 40, comprising a slippable adhesive sheet.

44. An article as defined in claim 40, comprising a wall covering.

* * * * *